US010844576B2

(12) United States Patent
Magnussen

(10) Patent No.: US 10,844,576 B2
(45) Date of Patent: Nov. 24, 2020

(54) SAFETY BARRIER

(71) Applicant: ACCESS INNOVATIONS GLOBAL LP, Orefield, PA (US)

(72) Inventor: Michael William Magnussen, Kingaroy (AU)

(73) Assignee: ACCESS INNOVATION GLOBAL LP, Orefield, PA (US)

( * ) Notice: Subject to any disclaimer, the term of this patent is extended or adjusted under 35 U.S.C. 154(b) by 0 days.

(21) Appl. No.: 15/575,214

(22) PCT Filed: May 10, 2016

(86) PCT No.: PCT/AU2016/050351
§ 371 (c)(1),
(2) Date: Nov. 17, 2017

(87) PCT Pub. No.: WO2016/183620
PCT Pub. Date: Nov. 24, 2016

(65) Prior Publication Data
US 2018/0148906 A1 May 31, 2018

(30) Foreign Application Priority Data
May 18, 2015 (AU) ................. 2015901785

(51) Int. Cl.
E02F 9/08 (2006.01)
E06C 5/02 (2006.01)
(Continued)

(52) U.S. Cl.
CPC .............. E02F 9/0833 (2013.01); E02F 9/24 (2013.01); E06C 5/02 (2013.01); B60R 3/005 (2013.01)

(58) Field of Classification Search
CPC .. E02F 9/0833; E02F 9/24; E06C 5/02; B60R 3/00; B60R 3/005; B60R 3/007; B60R 3/02; B60R 3/04; Y10T 292/0944; Y10T 292/0951; Y10T 292/0952; Y10T 292/0953; Y10T 292/0959; Y10T 292/1043; Y10T 292/1072;
(Continued)

(56) References Cited

U.S. PATENT DOCUMENTS 3,342,458 A * 9/1967 Simonton ........... E04H 17/1434
256/24
3,866,356 A * 2/1975 La Cook ............... E05F 1/1215
49/386
(Continued)

FOREIGN PATENT DOCUMENTS

JP  2011149176 A  8/2011
WO 2016041017 A1  3/2016

OTHER PUBLICATIONS

International Search Report and Written Opinion dated Sep. 2, 2016 for corresponding PCT Application No. PCT/AU2016/050351.

Primary Examiner — Katherine W Mitchell
Assistant Examiner — Shiref M Mekhaeil
(74) Attorney, Agent, or Firm — Norris McLaughlin, P.A.

(57) ABSTRACT

A safety barrier for an excavating machine, the safety barrier including: a first body configured to be located adjacent an ecrind of a walkway of the excavating machine; and a second body moveably connected to the first body, the second body being configured to move between an access position and a closed position.

20 Claims, 6 Drawing Sheets

(51) Int. Cl.
*E02F 9/24* (2006.01)
*B60R 3/00* (2006.01)

(58) Field of Classification Search
CPC ......... Y10T 292/1083; Y10T 292/1085; Y10T 292/1092; Y10T 292/323; Y10T 292/702; Y10T 292/42; Y10T 292/444; Y10S 292/29; E05C 3/004; E05C 3/02; E05C 3/04; E05C 3/041; E05C 3/044; E05C 3/045; E05C 3/046; E05B 65/0007
USPC ............. 49/50, 51, 381, 70, 73.1, 74.1, 386; 256/73
See application file for complete search history.

(56) References Cited

U.S. PATENT DOCUMENTS

| | | | | |
|---|---|---|---|---|
| 3,903,567 | A * | 9/1975 | Suska | E05F 1/1215 16/301 |
| 4,706,947 | A * | 11/1987 | Makibayashi | F16F 13/24 188/298 |
| 4,902,066 | A * | 2/1990 | Norman | B62D 33/0273 296/180.1 |
| 4,919,463 | A * | 4/1990 | McQuade | E05B 65/0007 292/106 |
| 5,813,494 | A | 9/1998 | Ulschmid et al. | |
| 6,068,277 | A * | 5/2000 | Magnussen | B60R 3/02 182/127 |
| 6,094,863 | A * | 8/2000 | LaCook, Jr. | E06B 11/02 49/49 |
| 6,176,042 | B1 * | 1/2001 | Rossman | A01K 1/0017 160/210 |
| 6,446,395 | B2 * | 9/2002 | Rogers | E06B 9/04 160/215 |
| 6,684,566 | B2 * | 2/2004 | LaCook | E06B 11/02 16/250 |
| 6,845,970 | B1 * | 1/2005 | Kenton | E04G 21/3233 256/73 |
| 7,152,372 | B2 * | 12/2006 | Cheng | E05B 65/0014 49/465 |
| 7,467,996 | B1 * | 12/2008 | Jager | A22C 17/0093 452/177 |
| 8,240,710 | B1 * | 8/2012 | Rawls | B60R 3/005 182/113 |
| 8,341,886 | B2 * | 1/2013 | Yates | E05B 65/0007 204/468 |
| 8,615,928 | B2 * | 12/2013 | Wang | E04H 17/00 49/226 |
| 9,279,284 | B1 * | 3/2016 | Axelrod | E06B 7/32 |
| 9,382,750 | B1 * | 7/2016 | Flannery | E06B 9/00 |
| 9,464,467 | B1 * | 10/2016 | Flannery | E05B 65/0007 |
| 9,689,197 | B1 * | 6/2017 | Flannery | E05B 15/022 |
| 9,879,453 | B1 * | 1/2018 | Flannery | E06B 9/00 |
| 2004/0178602 | A1 * | 9/2004 | King | B60R 3/00 280/163 |
| 2005/0189173 | A1 * | 9/2005 | Becker | E04G 5/14 182/113 |
| 2007/0051934 | A1 * | 3/2007 | LaCook | E06B 11/02 256/73 |
| 2008/0000163 | A1 * | 1/2008 | Stoffels | E05B 65/0007 49/394 |
| 2008/0284180 | A1 * | 11/2008 | Newcombe | E05B 65/0014 292/198 |
| 2009/0151610 | A1 * | 6/2009 | Horn | A01C 7/208 111/60 |
| 2009/0217591 | A1 * | 9/2009 | LaCook | E05D 11/06 49/50 |
| 2009/0241454 | A1 * | 10/2009 | Yeh | E06B 7/082 52/473 |
| 2010/0182218 | A1 * | 7/2010 | Daniel | G09F 9/33 345/1.3 |
| 2011/0308160 | A1 * | 12/2011 | Boucquey | E05B 65/0007 49/50 |
| 2013/0048400 | A1 * | 2/2013 | Holdener | B60R 3/02 180/89.1 |
| 2013/0092474 | A1 * | 4/2013 | Magnussen | E06C 5/04 182/127 |
| 2013/0160365 | A1 * | 6/2013 | Flannery | E06B 9/04 49/50 |
| 2014/0353083 | A1 * | 12/2014 | Samuel | B60R 3/005 182/87 |
| 2015/0027060 | A1 * | 1/2015 | Sousa | E06B 9/04 49/394 |
| 2015/0246641 | A1 * | 9/2015 | Jayapalan | B60R 3/005 182/113 |
| 2015/0259964 | A1 * | 9/2015 | Linehan | E05B 1/0053 49/272 |
| 2015/0291100 | A1 * | 10/2015 | Koshy | B60R 3/005 280/727 |
| 2016/0001707 | A1 * | 1/2016 | Madera | E02F 9/0833 182/223 |
| 2016/0129844 | A1 * | 5/2016 | Magnussen | B60R 3/005 280/760 |

* cited by examiner

SAFETY BARRIER

FIELD OF THE INVENTION

The invention relates to a safety barrier and method of use. In particular, the invention relates, but is not limited, to a safety barrier and method of use for an excavating machine.

BACKGROUND TO THE INVENTION

Reference to background art herein is not to be construed as an admission that such art constitutes common general knowledge in Australia or elsewhere.

The presence of a walkway mounted around a cabin of a vehicle such as a bulldozer provides, for example, the ability to clean the glass of the cabin. Also maintenance personnel can access and perform tasks on window wipers, lights, reversing alarms, rear cameras, and radio and GPS aerials and receivers mounted on and around the cabin.

Moreover, the walkway also enables an operator, when on the walkway, to view obstacles located close to the side and/or the rear of the bulldozer that would otherwise not be visible from the cabin.

However, an issue with walkways around the cabin of the bulldozer is that operators and maintenance personnel, for example, are susceptible to falling off parts of the walkway.

In particular, outside of cabin doors on a bulldozer, walkways do not provide adequate safety to prevent operators falling forward onto the drive tracks of the bulldozer below. Structures on the walkway also typically provide a visual obstacle from the cabin of the bulldozer.

OBJECT OF THE INVENTION

It is an aim of this invention to provide a safety barrier and method of use which overcomes or ameliorates one or more of the disadvantages or problems described above, or which at least provides a useful alternative.

Other preferred objects of the present invention will become apparent from the following description.

SUMMARY OF INVENTION

In one form, although not necessarily the only or broadest form, the invention resides in a safety barrier for an excavating machine, the safety barrier including:

a first body configured to be located adjacent an end of a walkway of the excavating machine; and a second body moveably connected to the first body, the second body being configured to move between an access position and a closed position.

Preferably, the excavating machine is a bulldozer.

Preferably, the first body includes a mounting structure. Preferably, the mounting structure is configured to be connected at or near the end of the walkway of the excavating machine. Preferably, the mounting structure is releasably connected at or near the end of the walkway of the excavating machine.

Preferably, the mounting structure includes a cross member. Preferably, the cross member extends in a direction across the walkway. Preferably, the cross member includes one or more stabilising plates. Preferably, one stabilising plate is located at or near an end of the cross member and another stabilising plate is located at or near another end of the cross member.

Preferably, the mounting structure includes one or more extension members. Preferably, the one or more extension members are connected to the cross member. Preferably, the one or more extension members are configured to be connected to the excavating machine. Preferably, the one or more extension members are releasably connected to the excavating machine via one or more weld plates. Preferably, the mounting structure includes two extension members. Preferably, one of the extension members extends from at or near an end of the cross member and another extension member extends from at or near another end of the cross member.

Preferably, the first body includes an upstanding structure. Preferably, the upstanding structure extends in a transverse direction away from the mounting structure. Preferably, the upstanding structure is connected to the mounting structure. Preferably, the upstanding structure is releasably connected to the one or more stabilising plates. Preferably, rubber vibration isolators are sandwiched between the upstanding structure and the one or more stabilising plates.

Preferably, the upstanding structure includes one or more upstanding members and one or more connecting parts. Preferably, the upstanding structure includes two upstanding members that are separated with the one or more connecting parts located therebetween. Preferably, the one or more connecting parts are in the form of a rod, wire and/or louver.

Preferably, the louver is angled to a horizontal plane. Preferably, the louver is angled to a vertical plane extending through the one or more upstanding members.

Preferably, the louver is angled to allow a line of sight therethrough from a cabin of the excavating machine. Preferably, the louver is angled relative to a connection plate of the upstanding members. Preferably, the louver acts as a kickrail. Preferably, the louver is a substitute kickrail.

Preferably, the upstanding structure includes one or more grab portions. Preferably, the one or more grab portions are in the form of a grab rail. Preferably, one grab portion is located on one side of the first body and another grab portion is located on another side of the first body.

Preferably, the upstanding structure includes one or more mounting supports configured to connect to the second body.

Preferably, the second body includes one or more upright parts. Preferably, the second body includes one or more traverse parts. Preferably, the one or more traverse parts extend transversely from the one or more upright parts. Preferably, the one or more traverse parts are in the form of a C-shaped member. Preferably, the one or more traverse parts include a louver. Preferably, the louver is angled to allow a line of sight therethrough from a cabin of the excavating machine. Preferably, the louver is angled to a horizontal plane. Preferably, the louver is angled to a vertical plane extending through the one or more upright parts.

Preferably, the one or more upright portions include one or more mounting supports configured to connect to the first body.

Preferably, the second body is configured to move between two access positions and the closed position. For example, the second body is configured to rotate in a first direction between the access position and the closed position and in an opposite direction between an access position and the closed position.

Preferably, a biasing member biases the second body towards the closed position. Preferably, the biasing member is located adjacent to the one or more mounting supports of the first body and the second body. Preferably, the biasing member extends substantially in a vertical direction.

Preferably, the safety barrier further includes a lock. Preferably, the lock is configured to assist in locking the second body in the closed position. Preferably, the lock is pivotally connected to the first body and moves between a first position and a lock position. Preferably, in the lock position, the lock extends across to the second body to assist in locking the second body in the closed position. Preferably, the lock includes a catch that straddles the traverse part of the second body in the locked position. Preferably, the catch is in the form of a saddle.

Preferably, the barrier includes a floor section. Preferably, the floor section covers an open portion between the upstanding structure and the walkway of the excavating machine. Preferably, the floor section is connected to the mounting structure. Preferably, a spacer spaces the floor section away from the mounting structure such that it is substantially level with the walkway.

Preferably, the floor section includes a first section and an access section. Preferably, the first section is connected to the mounting structure. Preferably, the access section is connected to the first section through a hinged connection. Preferably, the access section is configured to move from a first position to a second position. Preferably, in the first position the access section acts as a floor and, in the second position, easier access is provided to parts of the excavating machine. Preferably, in the first position, the access section is releasably connected to the excavating machine. Preferably, a rubber vibration isolator is located between the connection of the access section to the excavating machine.

Preferably, the safety barrier further includes a step located below the access section. Preferably, the step is configured to be releasably connected to the excavating machine. Preferably, the step includes an access section that is configured to rotate about an upright member. Preferably, upright member includes an upright section and a horizontal section. Preferably, the access section is connected to the horizontal section. Preferably, the step is configured to be moved from a first position to a second position. Preferably, in the first position the access section of the step acts as a floor and, in the second position, easier access is provided to parts of the excavating machine.

In another form the invention resides in a safety barrier for an excavating machine, the safety barrier including:
a first body configured to be located adjacent an edge of a walkway for the excavating machine, the first body comprising:
two upstanding members; and
one or more angled louvers between the upstanding members.

Preferably, the excavating machine is a bulldozer.

Preferably, the one or more angled louvers are angled to a horizontal plane. Preferably, the one or more angled louvers are angled to a vertical plane extending through the upstanding members.

Preferably, the one or more angled louvers are angled to allow a line of sight therethrough from a cabin of the excavating machine. Preferably, the one or more angled louvers are angled relative to a connection plate of the upstanding members.

Preferably, the one or more angled louvers are rectangular in shape.

Preferably, the one or more angled louvers are located along a lower portion of the upstanding member. Preferably, the safety barrier includes one or more rails between an upper portion of the two upstanding members.

Preferably, the first body is located adjacent an end of the walkway.

In another form the invention resides in an excavating machine, the
excavating machine including:
a walkway located adjacent to a cabin; and
a safety barrier including:
a first body located adjacent an end of the walkway; and
a second body moveably connected to the first body, the second body being configured to move between an access position and a closed position.

Preferably, the excavating machine is a bulldozer.

Preferably, the walkway extends in a direction substantially parallel to an axis of the excavating machine. Preferably, the axis is a longitudinal axis of the excavating machine.

Preferably, the safety barrier extends in a direction substantially transverse to the axis of the excavating machine. Preferably, the second body is located closer to the axis compared to the first body.

Preferably, the safety barrier extends from an outer portion on the walkway to an inner portion of the walkway. Preferably the inner portion of the walkway is located adjacent to the cabin.

Preferably, the safety barrier is located forward of the cabin. Preferably, the safety barrier is located forward of a door of the cabin.

Preferably, the safety barrier is located adjacent an engine.

Preferably, the excavating machine includes a further safety barrier. Preferably, the further safety barrier is located on an opposite side of the excavating machine to the safety barrier. Preferably, the further safety barrier is located adjacent a further end of the walkway. Preferably, the further safety barrier is located in an opposite location to the safety barrier as described herein.

Preferably, the safety barrier is as described herein. Preferably, the further safety barrier includes one or more of the features described herein with respect to the safety barrier.

Preferably, moving the access section of the floor or step to the second position allows access to service points of the engine.

In another form the invention resides in an excavating machine, the
excavating machine including:
a walkway located adjacent to a cabin; and
a safety barrier including:
a first body located adjacent an edge of the walkway, the first body comprising:
two upstanding members; and
one or more angled louvers between the upstanding members.

Preferably, the excavating machine is a bulldozer.

Preferably, the excavating machine includes a further safety barrier. Preferably, the further safety barrier is located on an opposite side of the excavating machine to the safety barrier. Preferably, the further safety barrier is located adjacent a further edge of the walkway.

Preferably, the safety barrier is as described herein. Preferably, the further safety barrier includes one or more of the features described herein with respect to the safety barrier.

In another form the invention resides in a method for using a safety barrier on an excavating machine, the method including the steps of: stepping onto the excavating machine;
moving a second body of the safety barrier from a closed position to an access position; and
moving past a first body of the safety barrier whilst the second body is in the access position.

Preferably, the step of moving the second body of the safety barrier from the closed position to the access position includes unlocking a lock. Preferably, the step of unlocking the lock includes pivoting the lock away from one or more transverse parts of the second body.

Preferably, the step of moving past the first body of the safety barrier whilst the second body is the access position includes moving towards a door of a cabin of the excavating machine.

Preferably, the method further includes returning the second body to the closed position. Preferably, the method further includes pivoting the lock to a locked position where the lock extends across to the second body. Preferably, the step of pivoting the lock to the locked position includes locating a catch over the one or more traverse parts of the second body.

Preferably, the method further includes moving an access section of a floor section of the safety barrier from a first position to a second position. Preferably, the method further includes accessing a service point of the excavating machine when the access section of the floor section is in the second position. Preferably, the access section of the floor section is in an upward position in the second position.

Preferably, the step of stepping onto the excavating machine includes stepping up onto a step located below the access section. Preferably, the method further includes moving an access section of the step from a first position to a second position. Preferably, the method further includes accessing a service point of the excavating machine when the access section of the step is in the second position. Preferably, the access section of the step is in a downward or upward position in the second position.

Preferably, the step of stepping onto the excavating machine includes grabbing a grab portion of the safety barrier to provide assistance.

Preferably, the method further includes moving the second body of the safety barrier from the closed position to a further access position.

Preferably, the excavating machine is a bulldozer.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION OF THE DRAWINGS

Figure 1:
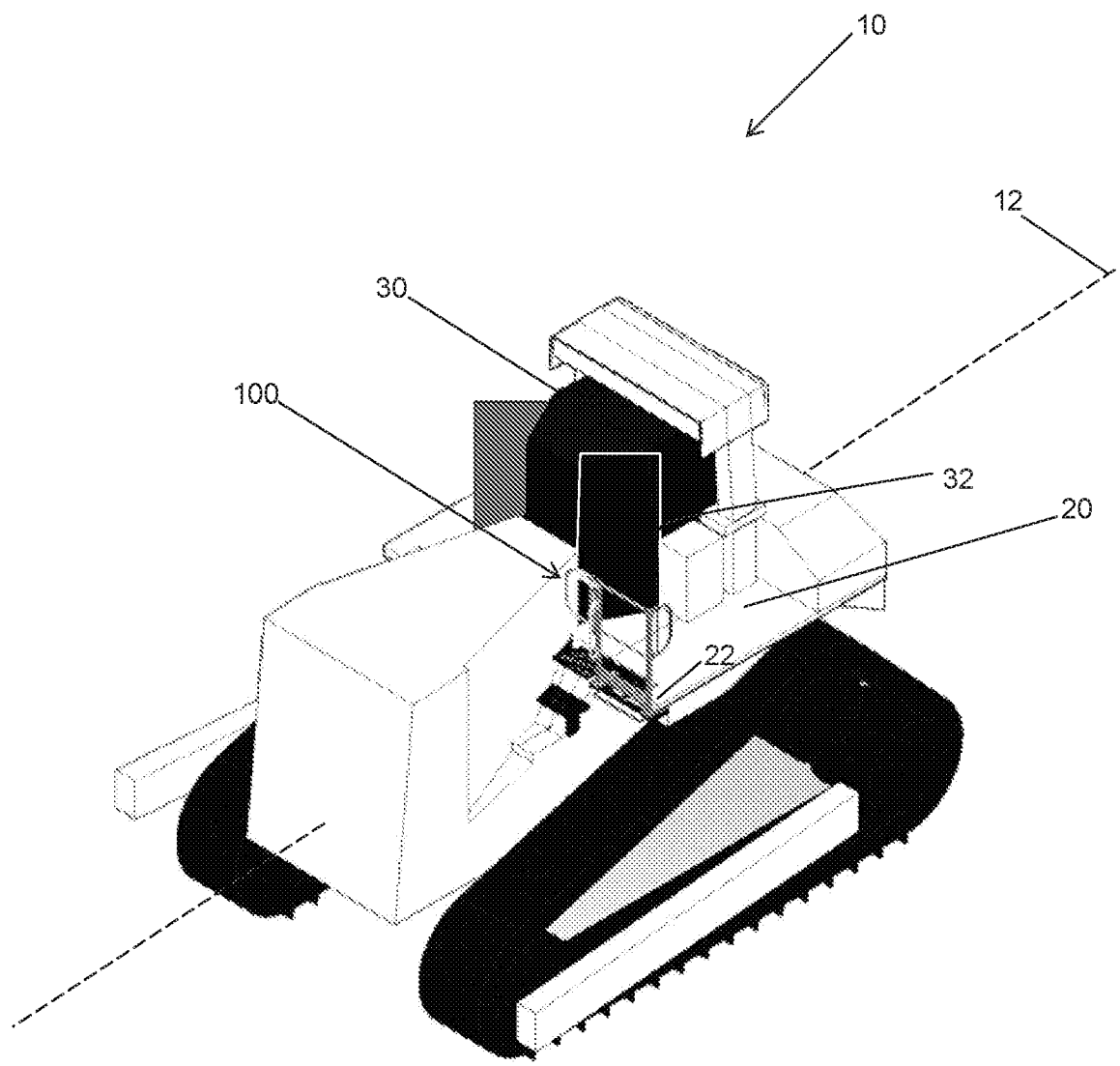
FIG. 1 illustrates a perspective view of an excavating machine, according to an embodiment of the invention.

FIG. 1 illustrates a perspective view of an excavating machine 10, according to an embodiment of the invention.

The excavating machine 10 is in the form of a dozer (i.e. a bulldozer) in this embodiment. The dozer takes the form of any one of a D8 to D11 caterpillar dozer. The dozer (i.e. the excavating machine 10) includes an axis 12, a walkway 20, a cabin 30 and a safety barrier 100. The axis 12 is a longitudinal axis that extends centrally along the dozer.

The walkway 20 in this embodiment is located to a side of the cabin 30. The walkway 20 extends from a rear portion of the dozer towards a front portion of the excavating machine 10. In this regard, the walkway 20 extends in a direction that is substantially parallel to the axis 12. The walkway 20 includes an end 22 where the safety barrier 100 is located adjacent thereto. Adjacent the end 22 is a relatively gradual path down the excavating machine 10 rather than a drop. The safety barrier 100 is discussed further below.

The cabin 30 in this embodiment is located towards the rear of the dozer. The cabin 30 is located centrally about the axis 12. The cabin 30 includes a door 32. The walkway 20 runs along the cabin 30 such that a person is able to step onto the walkway 20 upon exiting the cabin 30 through the door 32.

Figure 2:
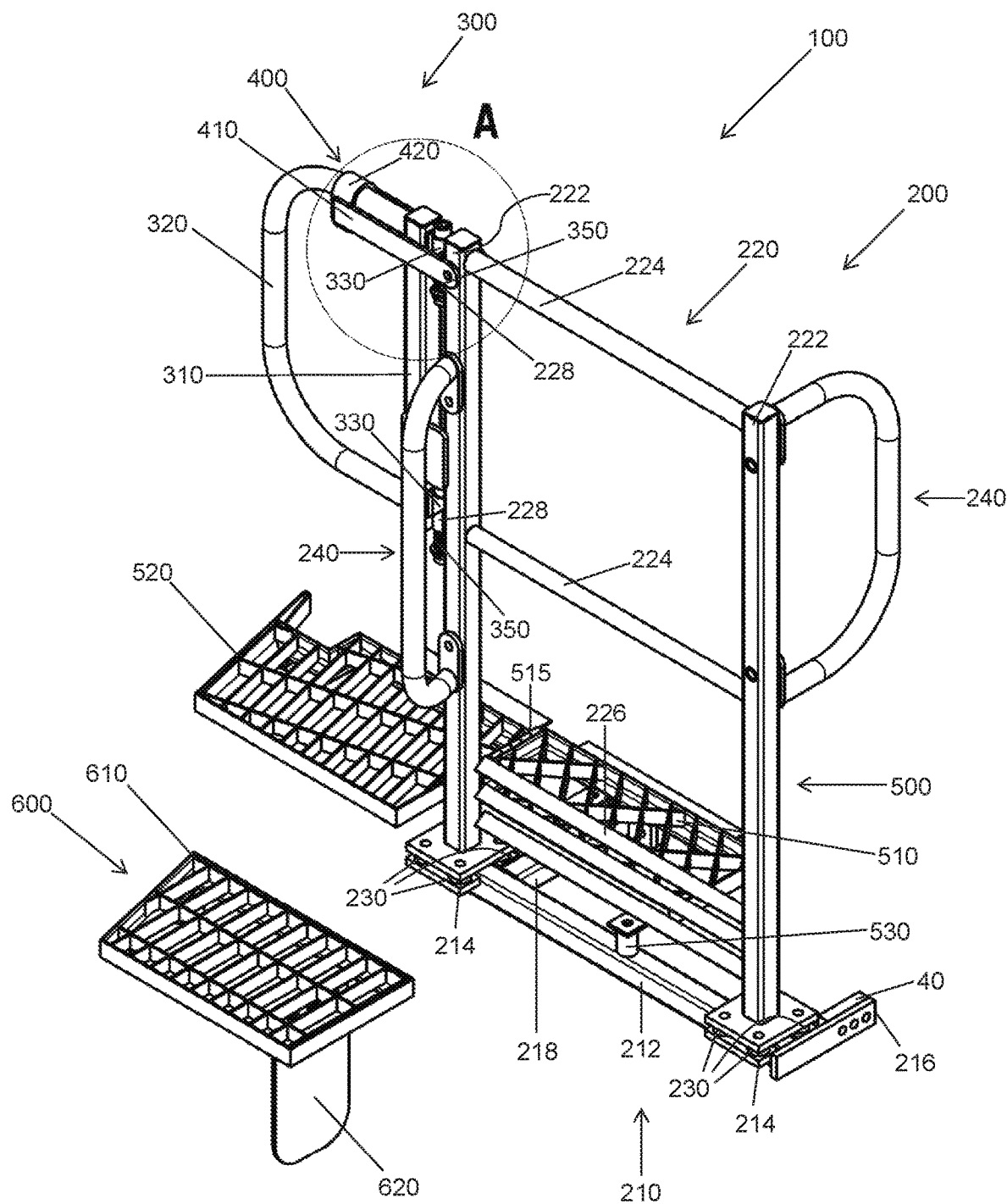
FIG. 2 illustrates an upper perspective view of a safety barrier shown in FIG. 1, according to an embodiment of the invention.
Figure 3:
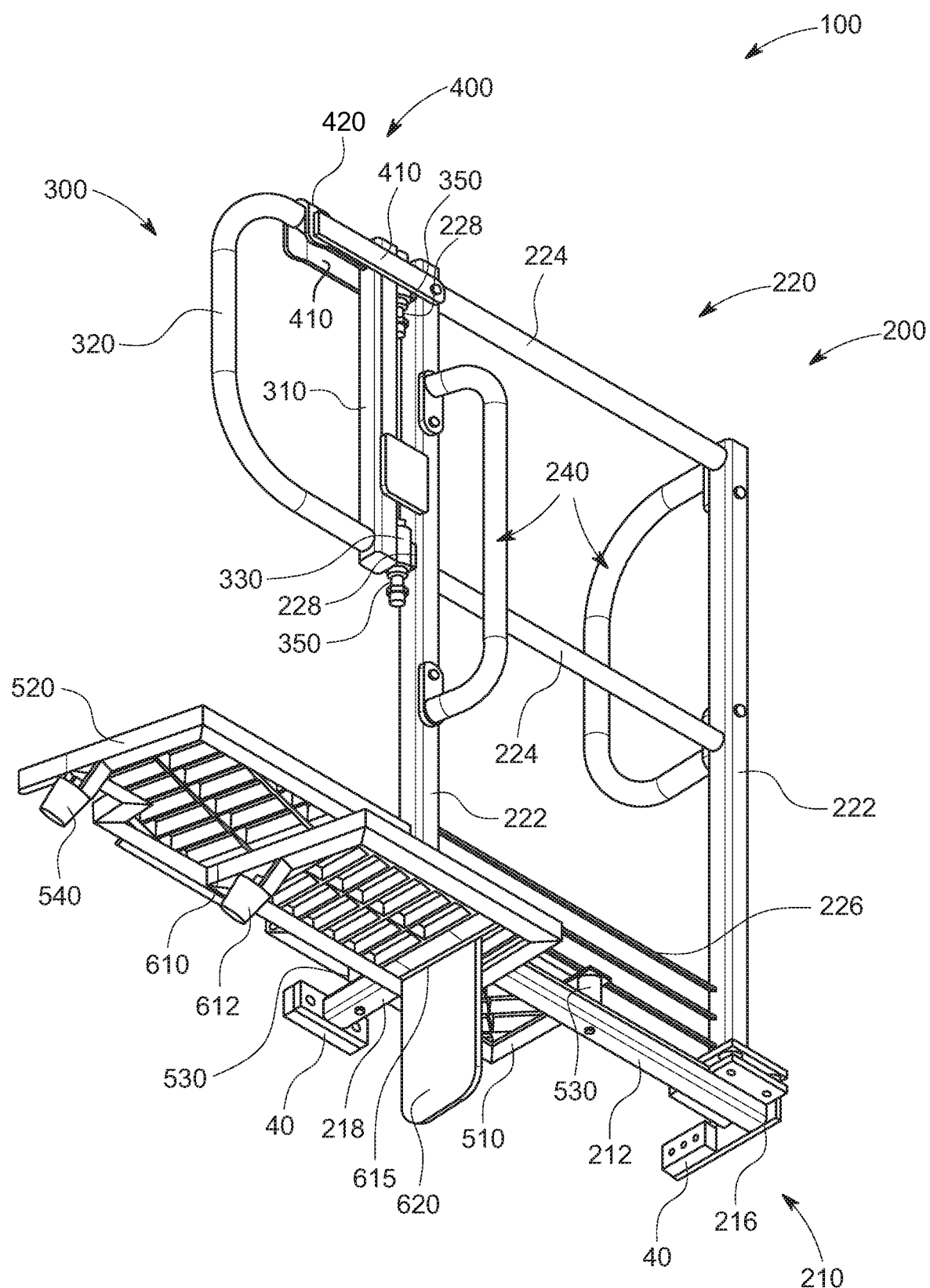
FIG. 3 illustrates a lower perspective view of the safety barrier shown in FIGS. 1 and 2, according to an embodiment of the invention.
Figure 4:
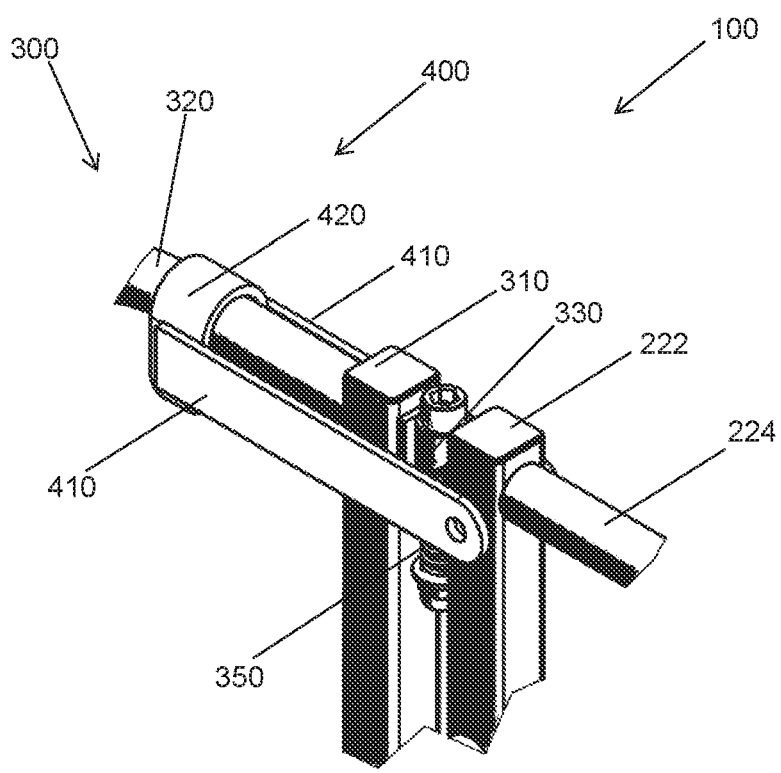
FIG. 4 illustrates a close up view of a lock shown in FIG. 2, according to an embodiment of the invention.

As shown in further detail in FIGS. 2 and 3, the safety barrier 100 includes a first body 200, a second body 300, a lock 400 and a floor section 500. Furthermore, the safety barrier 100 in this embodiment also includes a step 600.

The first body 200 and the second body 300 are configured to assist in preventing falls from the dozer. The first body 200 includes a mounting structure 210, an upstanding structure 220 and grab portions in the form of grab rails 240.

The mounting structure 210 includes a cross member 212, stabilising plates 214, and extension members 216, 218. The extension members 216, 218 are used to releasably connect the mounting structure 210 at or near (i.e. adjacent to) the end 22 of the walkway 20.

The cross member 212 extends in a direction across the walkway 20. That is, the cross member 212 extends from an outer portion of the walkway 20 towards the axis 12. The stabilising plates 214 are respectively located at either ends of the cross member 212.

The extension member 216 extends from an end of the cross member 212. The extension member 216 includes an adjustment portion in the form of a series of adjustment holes. It would also be appreciated that the adjustment portion may also be in the form of a slot. The extension member 216 is releasably connected to a body of the dozer by fastening the extension member 216, via the one or more of the adjustment holes, to a weld plate 40.

The extension member 218 extends from near another end of the cross member 212. The extension member 218 includes a T-shaped connection at one end for releasable attachment to a further weld plate 40. The T-shaped connection includes two holes therein in order to pass fasteners therethrough for releasable attachment to the further weld plate 40.

The upstanding structure 220 is substantially perpendicular to the mounting structure 210. The upstanding structure 220 provides the main support members for the fixed and folding handrail gate sections (i.e. the second body 300), as discussed further below. The upstanding structure 220 includes two upstanding members 222. The upstanding members 222 include a connection plate at one end that is configured to be connected to stabilising plates 214. Sandwiched between each of the stabilising plates 214 and the connection plates are rubber vibration isolators 230.

The inboard upstanding member 222 (i.e. the upstanding member 222 located nearest to the axis 12) also includes mounting supports 228. The mounting supports 228 are configured to be connect to the second body 300.

The upstanding structure 220 also includes connecting parts 224, 226 between the upstanding members 222. In this embodiment, connection parts 224 are in the form of rods and connection parts 226 are in the form of louvers. The connection parts 224, 226 assist in preventing an operator from falling from the walkway 20 or alike. The rods are located towards the top of the upstanding members 222 and the louvers are located towards the bottom of the upstanding members 222. Furthermore, in this embodiment, the louvers are angled louvers. The angled louvers allow a line of sight therethrough from the cabin 30 of the dozer. That is, the angled louvers are angled in a downward direction, relative to a horizontal plane, to provide a line of sight therethrough from the cabin 30 to the adjacent work environment. The angled louvers act as a kickrail.

The grab rails 240 are in the form of c-shaped rails in this embodiment. The grab rails 240 are respectively connected to the upstanding members 222. One grab rail 240 is connected to the upstanding member 222, closest to the axis 12, and faces towards the front of the excavating machine 10. The other grab rail 240 is connected to the outboard upstanding member 222, further away from the axis 12, and faces towards the rear of the excavator 10. The grab rails 240 assist a person stepping onto/off the dozer and/or moving around the walkway 20.

The second body 300 (i.e. handrail gate) includes an upright part 310 that, like the upstanding members 222, is formed from square hollow section steel. Extending from the upright part 310 is traverse part 320. The traverse part 320 is in the form of a c-shaped rail in this embodiment. The upright part 310 also includes mounting supports 330. The mounting supports 330 are configured to be connected to the mounting supports 228 of the first body 200 via a fastener.

The connection between the mounting supports 228, 330 allows the second body 300 to move relative to the first body 200. In particular, the second body 300 is able to rotate relative to the first body 200. The second body 200 is able to rotate, from a closed position to an access position, in a first direction towards the rear of the dozer. Furthermore, the second body 300 is able to rotate, from the closed position to a further access position, in an opposite direction towards the front of the dozer. The closed position of the second body 300 is shown in FIGS. 1 to 4. It would be appreciated that the access position is when the second body 300 extends in a transverse direction away from the first body 200 to allow a person (i.e. an operator) to pass therethrough.

The connection between the mounting supports 228, 330 also includes a biasing member 350 in the form of a spring. The biasing member 350 is configured to bias the second body 300 towards the closed position. In this regard, the biasing member 350 resists a rotational force to ensure that the second body 300 returns towards the closed position after an external force is applied thereto.

The lock 400 is connected to the inboard upstanding member 222. The lock 400 includes wings 410 and a catch 420. The lock 400 is shown in further detail in FIG. 4, which is a close up view of portion A in FIG. 2. The wings 410 extend from the catch 420 along a longitudinal axis of the lock 400. The catch 420 is in the form of a saddle in this embodiment.

The wings 410 of the lock are pivotally mounted to the inboard upstanding member 222. The catch 420 is configured to move over the traverse part 320 of the second body 300 when rotating from a first position to a lock position. The lock position is shown in FIGS. 1 to 4. In the locked position, the catch 420 straddles the traverse part 320 of the second body 300 to assist in preventing the second body 300 from moving from the closed position. In this regard, it would be appreciated that in the first position, the wings 410 and catch 420 do not extend along the traverse part 320, to allow a person to move the second body 300 to the access position.

The floor section 500 includes a first section 510 and an access section 520. The first section 510 and the access section 520 are respectively formed from a steel grate section. The first section 510 covers an open portion between the upstanding structure 220 and the walkway 20. That is, the first section 510 extends between the upstanding structure 220 and the walkway 20 to provide a floor. The first section 510 is connected to the mounting structure 210. Spacers 530 are used to space the first section 510 above the mounting structure 210 such that the first section 510 is substantially parallel with the walkway 20.

The access section 520 is moveably connected to the first section 510. In particular, the access section 520 is connected to the first section 510 via hinge 515. This allows the access section 520 to rotate, relative to the first section 510, from a first position where it acts as a floor to an upward position where easier access is given to parts of the dozer. In the first position, the access section 520 extends substantially parallel to a horizontal plane and is connected to the excavating machine via rubber vibration isolator 540.

The step 600 is located along a side of the dozer and below the access section 520. In particular, the step 600 is located along the engine side covers of the dozer. The step 600 provides a greater landing area compared to previous cut-outs providing steps of the dozer. This allows enhanced access to and from the dozer via the floor section 500 and walkway 20. The step 600 includes an access section 610 and an upright member 620. The upright member 620 is fixed to the dozer. The access section 620 is releasably connected to the dozer via rubber vibration isolator 612.

The access section 610 is moveably connected to the upright right member 620. In particular, the access section 610 is connected to the upright member 620, via a hinge 615, such that access section 610 is configured to rotate about the upright member 620. In this regard, the access section 610 is configured to rotate from a first position, which the access section 610 forms a step, to an upright position where easier access to parts of the dozer can be gained.

Figure 5:
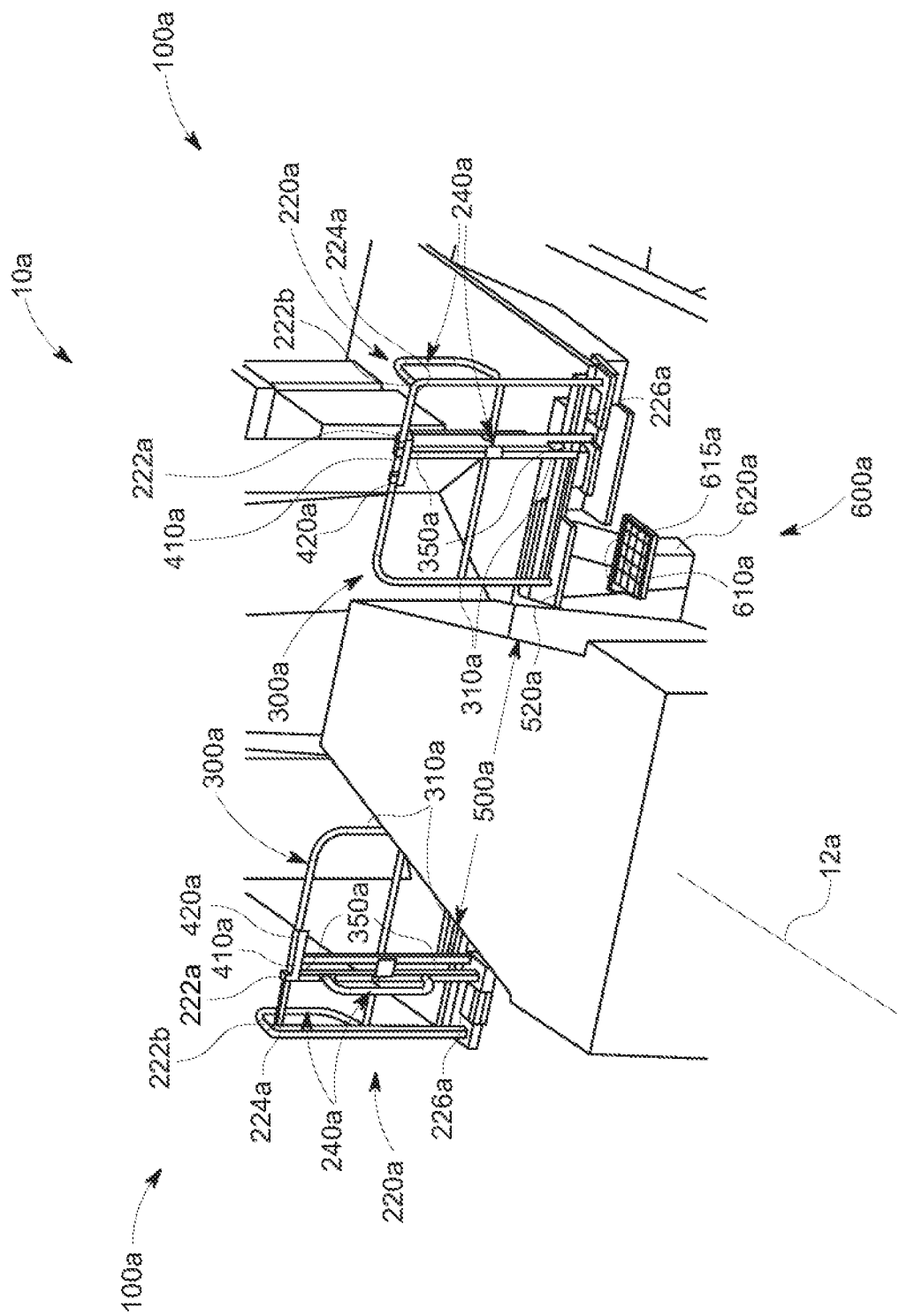
FIG. 5 illustrates a close up perspective view of an excavating machine, according to a further embodiment of the invention.

FIG. 5 illustrates a close up perspective view of an excavating machine 10a, according to a further embodiment of the invention. As would be appreciated, the excavating machine 10a includes similar features to the excavating machine 10 and, therefore, like numbering has been used. However, the following outlines differences between the excavating machine 10 and 10a. The excavating machine 10a is also in the form of a dozer (i.e. bulldozer) and reference will be made to the dozer below.

The dozer includes two safety barriers 100a located either side of the axis 12a. That is, the walkway 20a includes ends 22a where the safety barriers 100a are located adjacent thereto.

Furthermore, the inboard upstanding member 222a, nearest to the axis 12, is located closer to the outboard upstanding member 222b on a same side of the axis 12. This results in a larger second body 300a for the safety barrier 100a. In particular, the second body 300a extends from a lower portion of the inboard upstanding member 222a to the connecting part 224a.

The second body 300a also includes traverse parts in the form of angled louvers 326a. The angled louvers 326a allow a line of sight therethrough from the cabin 30a of the dozer. That is, the angled louvers 326a are angled in a downward direction, relative to a horizontal plane, to provide a line of sight therethrough from the cabin 30a to the adjacent work environment. The angled louvers 326a act as a kickrail for the floor section 500a (i.e. the extended cab walkway).

In addition, the upright member 620a is in the form of an L-shaped member having an upright section and a horizontal section. The access section 610a is connected, via a hinge, at or near an end of the horizontal section. This allows the access section 610a to rotate about the upright member 620a from a horizontal position to a downward facing position. The downward facing position of the access section 610a is shown further in FIG. 6. Furthermore, the access section 520a is also shown in an upwards direction in FIG. 6.

In use, a person in the form of an operator steps onto the excavating machine 10, 10a (i.e. the dozer). The operator normally steps onto a track of the dozer. From there, the operator is able to step onto the access section 610, 610a of the step 600, 600a. The operator may use the forward facing grab rail 240, 240a in order assist them stepping onto the access section 610, 610a of the step 600, 600a.

From the step 600, 600a, the operator may unlock the lock 400, 400a. In particular, the operator pivots the wings 410, 410a and catch 420, 420a away from the second body 300, 300a such that there is no restriction therebetween. The lock 400, 400a is typically moved so that it rests on the connection part 224, 224a (i.e. the upper rod).

Figure 6:
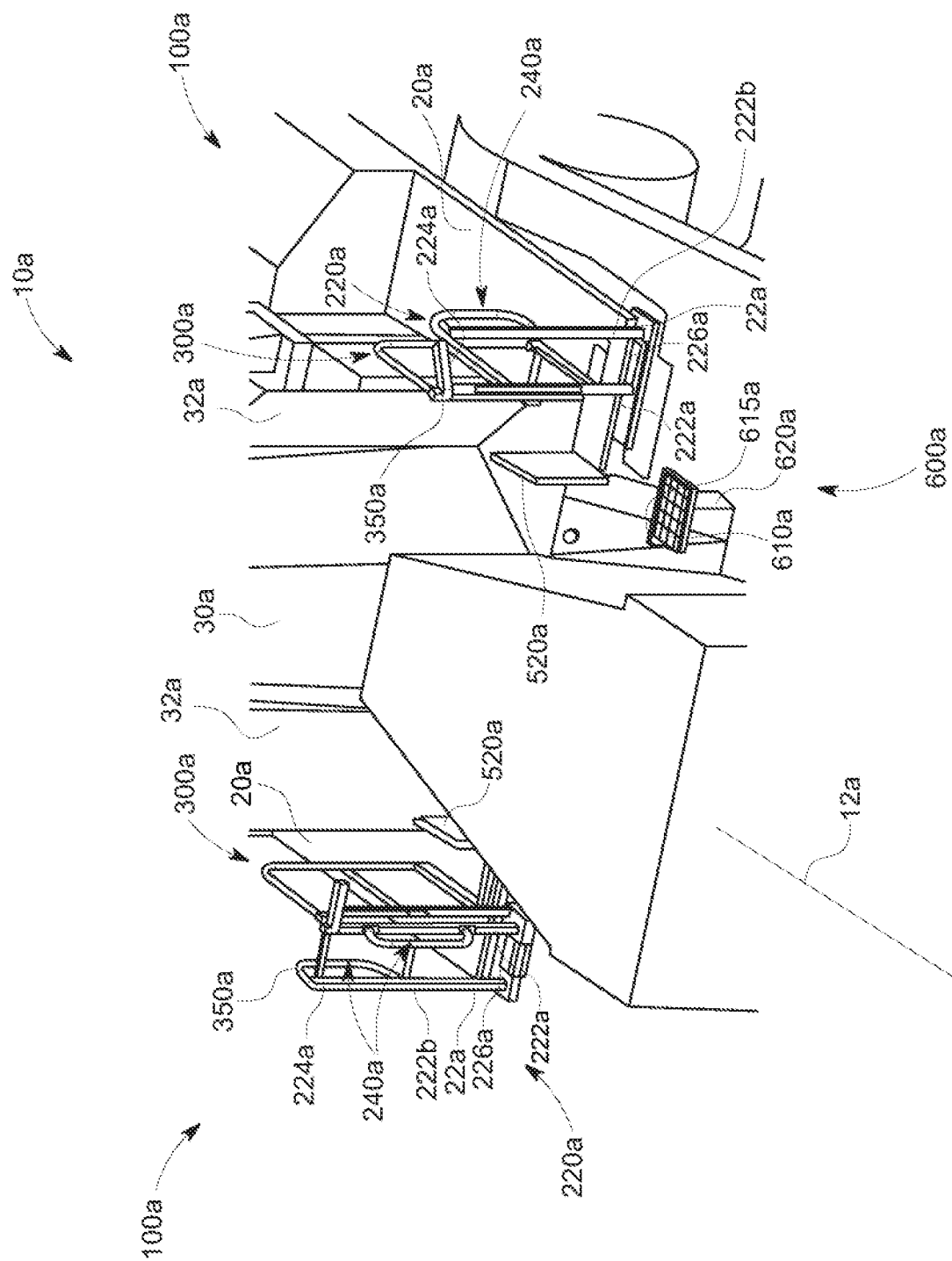
FIG. 6 illustrates an access configuration of a safety barrier shown in FIG. 5, according to an embodiment of the invention.

Following the above, the operator then pushes the second body 300, 300a to an access position such that second body 300, 300a rotates about the first body 200, 200a towards the rear of the dozer. An example of this is shown in FIG. 6 with respect to body 300a. The operator can then move past the safety barrier 100, 100a, towards the door 32, 32a of the cabin 30, 30a, by stepping past the first body 200, 200a as they hold the second body 300, 300a in the access position.

Once past the first body 200, 200a and the second body 300, 300a, the operator lets go of the second body 300, 300a, which then swings to the closed position (i.e. its original position shown in FIGS. 1 to 5). The second body 300, 300a is assisted by the biasing member 350, 350a to return to the closed position. In the closed position, the operator may also return the lock 400, 400a to the locked position. That is, the operator may pivot the lock 400, 400a back towards the second body 300, 300a such that the catch 420, 420a straddles the second body 300, 300a.

In view of the above, it will be appreciated that leaving the dozer through the safety barrier 100, 100a would be carried out in a similar manner. In particular, the lock 400, 400a would be moved to a first position where the second body 300, 300a rests on the connection part 224, 224a. The operator then pushes on the second body 300, 300a to an access position such that second body 300, 300a rotates about the first body 200, 200a towards the front of the dozer. The operator can then move past the first body 200, 200a and the second body 300, 300a down to the step 600, 600a and then off the dozer.

In use, the safety barrier 100 also provides access to other parts of the dozer when required. The access sections 520, 520a, 610 are both configured to rotate to an upright position when released from the dozer. The access section 610a is configured to rotate about the support 620a to a downward position when released from the dozer. In these positions, an operator is able to access an area to the side of the access sections 520, 520a, 610, 610a that may be in the form on an engine service point. Once the operator has finished servicing the dozer, for example, the access sections 520, 520a, 610, 610a may be returned to the positions shown in FIGS. 1 to 3 and 5, to act as a step/floor for the safety barrier 100, 100a.

The first body 200, 200a and the second body 300, 300a assist in preventing falls from the excavating machine 10, 10a (i.e. the dozer). That is, on standard dozer walkways 20, 20a outside of the cab doors 32, 32a, the operator has to move towards the front unprotected edge 22, 22a, particularly when they are moving around the cab doors 32, 32a as they leave the cabin 30, 30a. There is limited foot area available in front of the door 32, 32a of the cabin 30, 30a which exposes the operator to slipping off the walkway 20, 20a and onto the exposed tracks/blade arms below, resulting in injuries. The first body 200, 200a and the second body 300, 300a, in combination with the floor section 500, 500a, substantially eliminates this risk.

In snowing or mud conditions, the first body 200, 200a, second body 300, 300a, floor section 500, 500a and step 600, 600a also eliminate the risk of slips and falls. In addition, cut-out sections which original form step holes on the dozer are filled in order to reduce access to the cab 30, 30a to a constant level.

The lock 400, 400a also assists in keeping the second body 300, 300a in the closed position, further assisting in preventing falls from the excavating machine 10, 10a. In addition, the biasing member 250, 250a assists in returning the second body 300, 300a to a closed position, in order to increase safety.

Moreover, the access sections 520, 520a, 610, 610a along with the grab rails 240, 240a, provide assistance in moving up, off and around the dozer. The first section 510, 510a also covers an unsafe void between the walkway 20, 20a and the upstanding structure 220, 220a.

The movement of the access sections 520, 520a, 610, 610a assists in, for instance, servicing the dozer when service points are thereunder.

The angled louvers 326a also provide improved visibility from the cabin 30, 30a relative to other connectors (e.g. a rod). The angled louvers 326a also stiffen the connection between the upstanding members 222 or upright parts 310a in comparison to, for example, a wire. The angled louvers 326a also act as a kickrail for the floor section 500, 500a (i.e. the extend cab walkway).

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The claims defining the invention are as follows:

1. A safety barrier for an excavating machine, the safety barrier comprising:
   a first body configured to be located adjacent an end of a walkway of the excavating machine, wherein the first body has a total first height, defined between a top end of the first body and an opposite bottom end of the first body, a total first width, defined between a first end of the first body and an opposite second end of the first body, and a total first thickness, defined between a first side of the first body and an opposite second side of the first body, wherein the total first height of the first body is greater than the total first width of the first body, the total first width of the first body is greater than the total first thickness of the first body and the total first thickness of the first body defines a first plane extending outwardly from the first and second ends of the first body;
   a second body having a total second height, defined between a top end of the second body and an opposite bottom end of the second body, a total second width, defined between a first end of the second body and an opposite second end of the second body, and a total second thickness, defined between a first side of the second body and an opposite second side of the second body, wherein the total second height of the second body is greater than the total second width of the second body and the total second width of the second body is greater than the total second thickness of the second body, wherein the first end of the second body is moveably connected to the first end of the first body via a connection disposed between mounting supports of the first body and the second body, and the second body is rotatable via the connection, relative to the first body, to an access position and a closed position such that, when the second body is in the closed position, the entire second width of the second body is provided in the first plane defined by the total first thickness of the first body and, when the second body is in the access position, a portion of the entire second width of the second body is outside the first plane, and further wherein the connection, disposed between the mounting supports of the first body and the second body, comprises a biasing member in the form of a spring; and
   a lock rotatable between an unlocked position and a lock position and comprising wings and a catch, wherein the wings of the lock are pivotally connected to the first body, wherein, in the lock position, the lock extends across the second body for locking the second body in the closed position such that the catch of the lock straddles a traverse part of the second body, and further wherein, in the lock position, a portion of the connection is disposed between the wings of the lock.

2. The safety barrier of claim 1, wherein the first body comprises a mounting structure that is configured to be releasably connected at or near the end of the walkway of the excavating machine.

3. The safety barrier of claim 2, wherein the mounting structure comprises one or more extension members.

4. The safety barrier of claim 3, wherein the one or more extension members comprises two extension members located at or near respective ends of a cross member of the mounting structure.

5. The safety barrier of claim 1, wherein the first body comprises an upstanding structure that is releasably connected to one or more stabilizing plates.

6. The safety barrier of claim 5, wherein one or more rubber vibration isolators are sandwiched between the upstanding structure and the one or more stabilizing plates.

7. The safety barrier of claim 5, wherein the upstanding structure has two upstanding members that are separated with one or more connecting parts located therebetween.

8. The safety barrier of claim 7, wherein the one or more connecting parts are in the form of a rod, wire and/or louver.

9. The safety barrier of claim 8, wherein the one or more connecting parts are in the form of a louver that is angled to a horizontal plane.

10. The safety barrier of claim 1, further including a floor section having a first section and an access section, the access section being configured to move from a first position to a second position.

11. The safety barrier of claim 10, wherein in the first position the access section acts as a floor and, in the second position, easier access is provided to parts of the excavating machine.

12. The safety barrier of claim 1, wherein the biasing member is provided between the first body and the second body.

13. The safety barrier of claim 1, wherein the biasing member extends alongside a portion of the entire first length of the first body or the entire second length of the second body.

14. The safety barrier of claim 1, wherein the wings of the lock extend from the catch of the lock along a longitudinal axis of the lock and the catch is in the form of a saddle.

15. A safety barrier for an excavating machine, the safety barrier including:
   a first body configured to be located adjacent an edge of a walkway for the excavating machine, wherein the first body has a total first height, defined between a top end of the first body and an opposite bottom end of the first body, a total first width, defined between a first end of the first body and an opposite second end of the first body, and a total first thickness, defined between a first side of the first body and an opposite second side of the first body, wherein the total first height of the first body is greater than the total first width of the first body, the total first width of the first body is greater than the total first thickness of the first body and the total first thickness of the first body defines a first plane extending outwardly away from the first and second ends of the first body, wherein the first body comprises:
   two upstanding members; and
   one or more angled louvers between the upstanding members;
   a second body having a total second height, defined between a top end of the second body and an opposite bottom end of the second body, a total second width, defined between a first end of the second body and an opposite second end of the second body, and a total second thickness, defined between a first side of the second body and an opposite second side of the second body, wherein the total second height of the second body is greater than the total second width of the second body and the total second width of the second body is greater than the total second thickness of the second body, wherein the first end of the second body is moveably connected to the first end of the first body via a connection disposed between mounting supports of the first body and the second body and the second body is movable via the connection between an access position and a closed position such that, when the second body is in closed position, the entire second width of the second body is provided in the first plane defined by the total first thickness of the first body and, when the second body is in the access position, a portion of the total second width of the second body is outside the first body, and further wherein the connection, disposed between the mounting supports of the first body and the second body, comprises a biasing member in the form of a spring; and a lock rotatable between an unlocked position and a lock position and comprising wings and a catch, wherein the wings of the lock are pivotally connected to the first body, wherein, in the lock position, the lock extends across the second body for locking the second body in the closed position such that the catch of the lock straddles a traverse part of the second body, and further wherein, in the lock position, a portion of the connection is disposed between the wings of the lock.

16. The safety barrier of claim 15, wherein the one or more angled louvers are angled to allow a line of sight therethrough from a cabin of the excavating machine.

17. An excavating machine comprising:
a walkway located adjacent to a cabin; and
the safety barrier of claim 1.

18. A method for utilizing the safety barrier, according to claim 1, on the excavating machine, the method comprising:
stepping onto the excavating machine;
moving the second body of the safety barrier from the closed position to the access position; and
moving past the first body of the safety barrier when the second body is provided in the access position.

19. The method of claim 18, further comprising:
unlocking the lock associated with the second body.

20. The method of claim 18, further comprising:
moving an access section of a floor section of the safety barrier from a first position to a second position.

\* \* \* \* \*